United States Patent
Hirose et al.

(10) Patent No.: US 7,808,169 B2
(45) Date of Patent: Oct. 5, 2010

(54) ELECTRON EMITTING DEVICE AND ELECTROMAGNETIC WAVE GENERATING DEVICE USING THE SAME

(75) Inventors: Yutaka Hirose, Kyoto (JP); Daisuke Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 11/620,076

(22) Filed: Jan. 5, 2007

(65) Prior Publication Data

US 2007/0257595 A1    Nov. 8, 2007

(30) Foreign Application Priority Data

Jan. 12, 2006   (JP)   ............... 2006-005360

(51) Int. Cl.
*H01J 1/62*   (2006.01)
*H01J 63/04*  (2006.01)

(52) U.S. Cl. ............... 313/309; 313/336; 313/351; 313/495

(58) Field of Classification Search ............... None
See application file for complete search history.

(56) References Cited

U.S. PATENT DOCUMENTS

| | | | |
|---|---|---|---|
| 6,303,094 B1 | 10/2001 | Kasunoki et al. | |
| 6,350,488 B1 | 2/2002 | Lee et al. | |
| 6,514,113 B1 | 2/2003 | Lee et al. | |
| 7,508,122 B2* | 3/2009 | Huber | 313/309 |
| 2001/0024084 A1* | 9/2001 | Kajiwara | 313/486 |
| 2002/0036452 A1* | 3/2002 | Muroyama et al. | 313/310 |
| 2005/0110393 A1* | 5/2005 | Han et al. | 313/495 |
| 2005/0236953 A1* | 10/2005 | Lee et al. | 313/310 |
| 2006/0186786 A1* | 8/2006 | Iwamatsu et al. | 313/495 |
| 2007/0080641 A1* | 4/2007 | Yamamoto | 313/586 |
| 2007/0262320 A1* | 11/2007 | Hirose et al. | 257/77 |

FOREIGN PATENT DOCUMENTS

| | | |
|---|---|---|
| EP | 1061043 | 12/2000 |
| JP | 10-265208 | 10/1998 |
| JP | 2001-015077 | 1/2001 |
| JP | 2001-020071 | 1/2001 |
| JP | 2001-020072 | 1/2001 |

(Continued)

OTHER PUBLICATIONS

U.S. Appl. No. 11/617,060 (Hirose et al.), dated Dec. 28, 2006.*

(Continued)

*Primary Examiner*—Ashok Patel
(74) *Attorney, Agent, or Firm*—Greenblum & Bernstein, P.L.C.

(57) ABSTRACT

Provided is an electron emitting device which can achieve high electron emission efficiency even in the case where excitation energy is low. The device includes a carbon nanotube layer which is formed on an SiC substrate and is made up of plural carbon nanotubes vertically oriented with respect to a surface of the SiC substrate; an MgO layer which is formed on and touches the carbon nanotube layer; an ohmic electrode which is connected to the carbon nanotube layer; an electrode which is facing the MgO layer with an air-gap between the MgO layer and the electrode; and a voltage source which applies a voltage between the electrode and the ohmic electrode.

9 Claims, 6 Drawing Sheets

FOREIGN PATENT DOCUMENTS

JP        2002-293522        10/2002

OTHER PUBLICATIONS

J. Bonard et al., "Field Emission from Carbon Nanotubes: The First Five Years", Solid State Electronics, vol. 45, (2001), pp. 893-914.

W. Kim et al., "Secondary Electron Emission from Magnesium Oxide on Multiwalled Carbon Nanotubes", Applied Physics Letters, vol. 81, No. 6, Aug. 5, 2002, pp. 1098-1100.
English Language Abstract of JP 2001-015077.
English Language Abstract of JP 2001-020071.
English Language Abstract of JP 2001-020072.
English Language Abstract of JP 10-265208.
English Language Abstract of JP 2002-293522.

* cited by examiner

FIG. 1

PRIOR ART

ELECTRON EMITTING DEVICE AND ELECTROMAGNETIC WAVE GENERATING DEVICE USING THE SAME

BACKGROUND OF THE INVENTION (1) Field of the Invention

The present invention relates to an electron emitting device and an electromagnetic wave generating device, and particularly to an electron emitting device and an electromagnetic wave generating device which uses a carbon nanotube.

(2) Description of the Related Art

In recent years, as the need for improving performance of displays, electron microscopes, lighting systems, electromagnetic wave generating devices and the like intensify, development of electron emitting devices which use carbon nanotubes is underway for the purpose of realizing high-efficiency and high-power electron emitting devices which are used for the aforementioned equipment. The carbon nanotubes have properties that can achieve extremely high electric conductivity along the direction of each tube. Furthermore, since a carbon nanotube tip is sharper than tips of metal materials used as conventional electron emitting sources, the electric field intensity of the carbon nanotube tip is equal to or more than 10 times higher than the intensity of flat tips of metal materials. Thus, according to J-M Bonard et al., Solid-State Electronics Vol. 45 (2001), p. 893, by using carbon nanotubes in electron emitting devices, it is expected to be able to achieve high electron emission efficiency. In addition, since a carbon nanotube has high mechanical strength, using carbon nanotubes, it is also expected so that there is an advantage of realizing long-life and low-cost electron emitting devices.

In order to achieve high electron emission efficiency as expected, it is necessary to orient carbon nanotubes with respect to the direction where electrons are emitted and to emit, with certainty, the electrons from each carbon nanotube tip. The following two methods are reported as the carbon nanotube orientation growth technique: a method of generating a carbon nanotube by depositing, on a substrate, a metal layer which serves as a catalyst and causes gas-phase chemical reaction in hydrocarbon gas while keeping, at high temperatures, the substrate on which this metal layer has been deposited (for example, refer to Japanese Laid-Open Patent Applications No. 2001-15077, No. 2001-20071, and No. 2001-20072); and a method of generating an oriented carbon nanotube by removing Si when performing high-temperature annealing on SiC in a vacuum (for example, refer to Japanese Laid-Open Patent Applications No. 10-265208 and 2002-293522). Furthermore, FIG. 1 shows one of the examples of an electron emitting device structured using carbon nanotubes which are oriented in such a manner.

In the diagram, this electron emitting device has a structure including: an $n^-$ type SiC substrate 11; a carbon nanotube layer 12 which is formed with a high-temperature annealing method in a vacuum and is made up of oriented carbon nanotubes; an electrode 15; an ohmic electrode 17; and a voltage source 16 which applies a voltage between the electrode 15 and the ohmic electrode 17 which is on the SiC substrate 11. In such an electron emitting device, electrons emitted from the surface of the carbon nanotube layer 12 travels in an air-gap 14.

Figure 1:
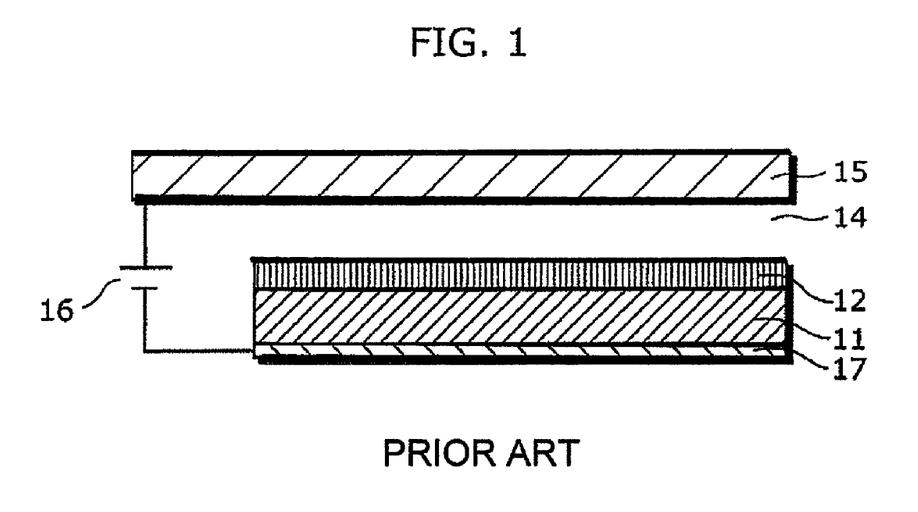
FIG. 1 is a cross-sectional view schematically showing the structure of a conventional electron emitting device.

However, even in the electron emitting device in which the oriented carbon nanotubes are used as shown in FIG. 1, the work function which is a parameter that controls electron emission efficiency is extremely high, ranging from 4 to 5 eV. Thus, in order to achieve high electron emission efficiency, still high excitation energy is required. Consequently, this electron emitting device can not achieve high electron emission efficiency.

Here, as a technique which enhances electron emission efficiency, a technique is reported in W. S, Kim et al., Applied Physics Letters, Vol. 81 (2002), p. 1098, in which an electron beam is irradiated on carbon nanotubes of which orientation is imperfect but which are coated with MgO so as to emit secondary electrons. However, with this technique, because the nanotubes are oriented in random direction, in the case where the excitation energy of the electron beam is low, it is not possible to achieve the expected high electron emission efficiency. Therefore, even with this technique, it is not possible to achieve the high electron emission efficiency.

Thus, the object of the present invention is to provide an electron emitting device that can achieve high electron emission efficiency even in the case where excitation energy is low.

SUMMARY OF THE INVENTION

In order to achieve the aforementioned object, the electron emitting device of the present invention includes: a carbon nanotube layer which is formed on a substrate and is made up of plural carbon nanotubes which are vertically oriented with respect to a surface of the substrate; a metal oxide layer which is formed on the carbon nanotube layer and touches the carbon nanotube layer; a first electrode which is connected to the carbon nanotube layer; and a second electrode which is facing the metal oxide layer at a distance.

With the aforementioned structure, a metal oxide layer is formed on the surface of the carbon nanotube layer, the barrier height in the case where electrons in the carbon nanotubes are emitted from the surface is lowered, and high excitation energy is not required as the conventional electron emitting devices require. Thus, it is possible to achieve high electron emission efficiency, even when excitation energy is low.

Here, it is preferable that a maximum thickness of the metal oxide layer is less than a maximum diameter of the carbon nanotube. In addition, it is further preferable that the plural carbon nanotubes are vertically oriented with respect to the surface of the substrate, and a length of the metal oxide layer in a vertical direction with respect to the surface of the substrate is less than a maximum diameter of the carbon nanotube, and the metal oxide layer is on tips of the plural carbon nanotubes.

With the aforementioned structure, a metal oxide layer is selectively formed only on a carbon nanotube tip. Thus, it is possible to guarantee that the sharp carbon nanotube tip in which electric field intensity is the strongest becomes the lowest part of the barrier height on the surface. Furthermore, since each carbon nanotube is oriented with respect to the electron emission direction, it is possible to emit, from each of the carbon nanotube tips with certainty, electrons of which characteristics are consistent. As a result, it is possible to further enhance electron emission efficiency.

Furthermore, it is preferable that the metal oxide layer is formed between the plural carbon nanotubes.

With the aforementioned structure, the electrons which are excited in a carbon nanotube sidewall can be emitted to a vacuum with the effect of metal oxides. As a result, even when electrons do not reach the carbon nanotube tips, they can be emitted. Thus, since the time from excitation to emission is shortened, it is possible to further enhance electron emission efficiency.

Furthermore, it is preferable that the metal oxide layer is formed inside the carbon nanotube.

With the aforementioned structure, the electrons which are excited inside a carbon nanotube which is away from the surface of the carbon nanotube can be emitted to a vacuum with the effect of metal oxides. As a result, even when electrons do not reach the carbon nanotube tips, they can be emitted. Thus, as the time from excitation to emission is shortened, it is possible to further enhance electron emission efficiency.

It is preferable that the metal oxide layer includes one of MgO, BaO, CaO, BeO, and SrO.

With the aforementioned structure, since the material having high energy level in an electronic conduction band of a metal oxide can be used, the barrier height can be lowered so that the electrons which are excited in the carbon nanotubes and reach the energy level in the electronic conduction band can easily be emitted from the surface to a vacuum. As a result, it is possible to further enhance electron emission efficiency.

In addition, the present invention can be used as an electromagnetic wave generating device including: a carbon nanotube layer which is formed on a substrate and is made up of is plural carbon nanotubes; a metal oxide layer which is formed on the carbon nanotube layer and touches the carbon nanotube layer; light source which irradiates pulse light to the carbon nanotube layer; a first electrode which is connected to the carbon nanotube layer; and a second electrode which is facing the metal oxide layer at a distance.

With the aforementioned structure, even when the electrons which are excited by pulse light inside the carbon nanotubes are not excited with sufficient energy enough to directly overcome the high work function of the carbon nanotubes, the electrons can be emitted from an electron emission plane to a vacuum with the effect of metal oxides. Furthermore, it becomes possible to generate a terahertz electromagnetic wave by applying an ultra-short pulse laser beam with a time duration of equal to or less than 10 ps to the pulse light which is irradiated on the carbon nanotube layer. As a result, it is possible to realize a high-power terahertz wave generating device.

In addition, the present invention can be used as a method for manufacturing an electron emitting device which includes: forming a carbon nanotube layer on a substrate, the carbon nanotube layer being made up of plural carbon nanotubes; and forming a metal oxide layer on the carbon nanotube layer so as to touch the carbon nanotube layer, wherein the forming of the metal oxide layer includes forming of the metal oxide layer so that a maximum thickness of the metal oxide layer is less than a maximum diameter of the carbon nanotube. Here, it is preferable that the metal oxide layer is formed by keeping a temperature of the substrate at equal to or less than 300 degree centigrade in forming of the metal oxide layer.

With the aforementioned method, it is possible to selectively form a metal oxide layer only on a carbon nanotube tip.

Here, it is preferable that the metal oxide layer is formed by keeping a temperature of the substrate at equal to or more than 100 is degree centigrade in forming of the metal oxide layer.

With the aforementioned method, since metal oxides are sufficiently diffused in an air-gap and a defect of each carbon nanotube in forming of the metal oxide layer, it is possible to form, with certainty, the metal oxide layer in the air-gap between the carbon nanotubes and to form the metal oxide layer inside the carbon nanotube.

Here, it is preferable that the forming of the carbon nanotube layer includes forming of the carbon nanotube layer made up of the plural carbon nanotubes which are vertically oriented with respect to a surface of the substrate, the method further includes removing of a part of a tip of each of the plural carbon nanotubes, and the forming of the metal oxide layer includes forming of the metal oxide layer on the carbon nanotube layer made up of the plural carbon nanotubes from each of which the part of the tip has been removed.

With the aforementioned method, it is possible to introduce a metal oxide layer from a part from which the carbon nanotube tip is removed to the interior of the carbon nanotube in forming of the metal oxide and to increase the amount of metal oxide which is formed inside the carbon nanotube.

According to the electron emitting device of the present invention, it is possible to achieve high electron emission efficiency, even when excitation energy is low.

FURTHER INFORMATION ABOUT TECHNICAL
BACKGROUND TO THIS APPLICATION

The disclosure of Japanese Patent Application No. 2006-005360 filed on Jan. 12, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED
EMBODIMENT(S)

First Embodiment

The electron emitting device according to the first embodiment of the present invention is described with reference to the diagrams.

Figure 2A:
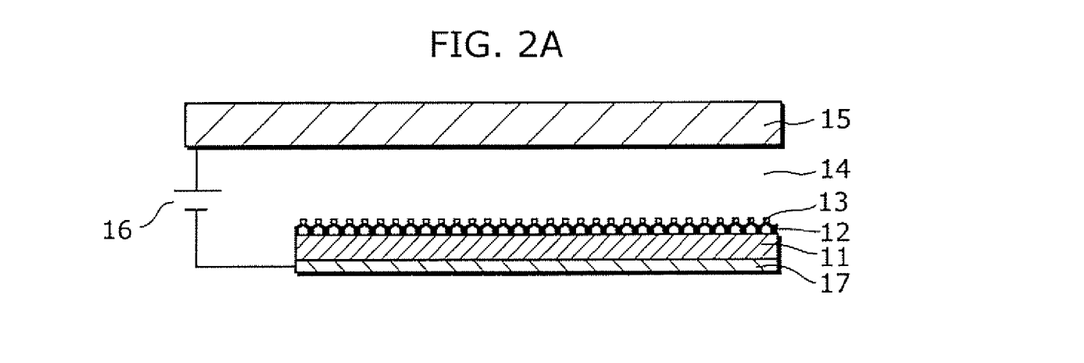
FIG. 2A is a cross-sectional view schematically showing the structure of the electron emitting device according to the first embodiment of the present invention.

FIG. 2A is a cross-sectional view schematically showing structure of the electron emitting device according to the present embodiment.

As shown in FIG. 2A, the carbon nanotube layer 12 is made up of plural carbon nanotubes each of which has the height of 200 nm and which are directed normal to the surface of the SiC substrate 11, in other words, of which tips are vertically oriented with respect to the surface of the SiC substrate 11, and is formed on the SiC substrate 11. This carbon nanotube layer 12 is formed by annealing the SiC substrate 11 in a vacuum of $1 \times 10^{-5}$ Torr for 60 minutes at 1000 degree centigrade and removing Si so that carbon remains.

Furthermore, a magnesium oxide (MgO) layer 13 touches the carbon nanotube layer 12, has the thickness of equal to or less than 100 nm, for example, the thickness of 10 nm, and is formed on the carbon nanotube layer 12. This MgO layer 13 is formed by depositing MgO on the carbon nanotube layer 12 with the electron-beam evaporation method. The electron emission plane is composed of the MgO layer 13 and the carbon nanotube layer 12.

Furthermore, the electrode 15 is placed above the MgO layer 13, and facing the MgO layer 13 with the air-gap 14 of the distance 10 µm, which is between the MgO layer 13 and the electrode 15. This electrode 15 is an electrode which can apply a relatively positive bias voltage to the SiC substrate 11 and serves as an anode which collects emitted electrons. Furthermore, the ohmic electrode 17 which is electrically connected to the carbon nanotube layer 12 is formed on the backside of the SiC substrate 11. The voltage source 16 is connected to the electrode 15 and the ohmic electrode 17, and a voltage is applied therebetween. Note that although it is described above that the ohmic electrode 17 is formed on the backside of the SiC substrate 11, the ohmic electrode 17 may be formed on the surface of the SiC substrate 11 by removing respective parts of the MgO layer 13 and the carbon nanotube layer 12.

Figure 2B:
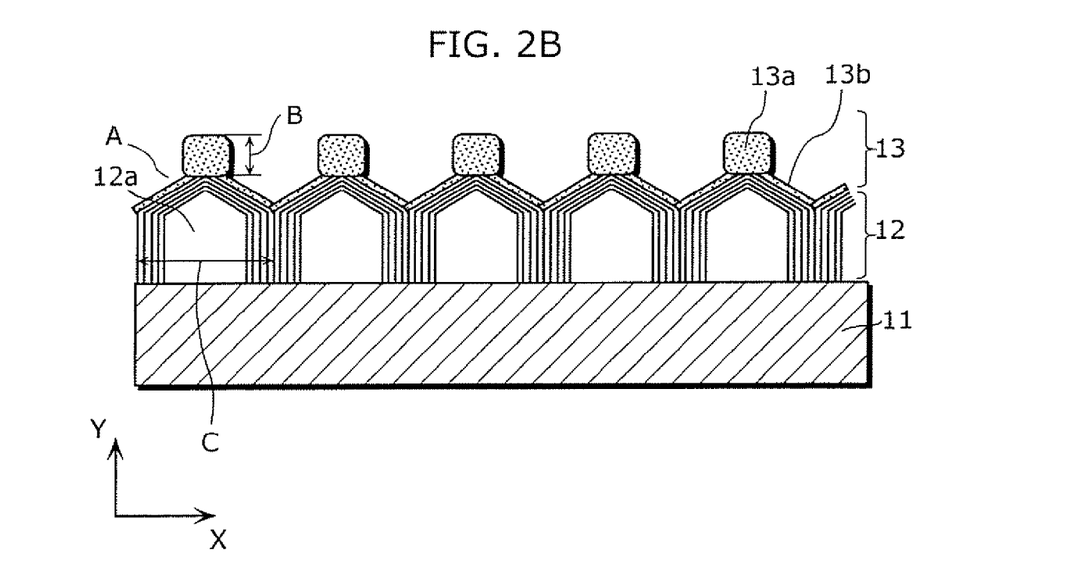
FIG. 2B is a cross-sectional view showing the detailed structure of the top surface of the electron emission plane.
Figure 2C:
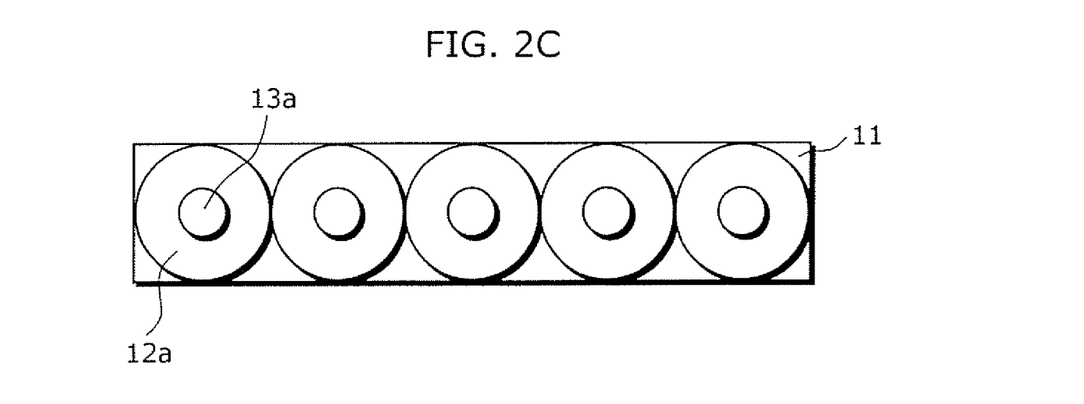
FIG. 2C is a top surface view showing the detailed structure of the top surface of the electron emission plane.

FIGS. 2B and 2C are a cross-sectional view and a top surface view respectively showing the detailed structure of the top surface of the electron emission plane.

As shown in FIG. 2B, the carbon nanotube layer 12 formed on the surface of the SiC substrate 11 is composed of multi-wall-type carbon nanotubes 12a, each of which is made up of carbon planes with five layers in average and has an average diameter of 110 nm (an average length of the carbon nanotube 12a with respect to the X direction in FIG. 2B). Each of the carbon nanotubes 12a has a structure in which the carbon planes are closed at the top surface while a predetermined distance is maintained between the carbon planes, and each has a sharp tip (indicated by A in FIG. 2B). The MgO layer 13 in which MgO has been vapor-deposited with electron beams is formed on the carbon nanotubes 12a each having the aforementioned structure. The MgO layer 13 is composed of: plural MgO 13a each of which is selectively migrated to the tip of the carbon nanotube 12a, of which length with respect to the vertical direction is less than the maximum diameter of the carbon nanotube 12a, and which is formed on the top of the tip of the carbon nanotube 12a, and MgO 13b which is formed on another portion of the MgO layer 13 other than on the tops of the tips of the carbon nanotubes 12a. Thus, the reason why each migrated MgO 13a is formed on the tip of the carbon nanotube 12a is because atomic arrangement of graphite carbon in an ideal carbon plane is misaligned and an imperfect structure is formed in which atoms are realigned, which causes extremely high chemical to different types of atoms and molecules. In this case, the temperature of the SiC substrate 11 is kept at equal to or less than 300 degree centigrade so that the maximum thickness B (maximum length of the MgO layer 13 with respect to the Y direction in FIG. 2B) is thinner than or preferably, equal to or less than one tenth of the maximum diameter C of the carbon nanotube 12a (maximum length of the carbon nanotube 12a with respect to the X direction in FIG. 2B). With this, it becomes possible to form the MgO layer 13 in which the amount to be coated with MgO on the tips of the carbon nanotubes 12a is selectively increased. As a result, the thickness of the portion of the MgO layer 13 which is on the tip of the carbon nanotube 12a (the length B) becomes thicker than the thickness of another portion of the MgO layer 13 other than the portion on the MgO layer 13 which is on the tip of the carbon nanotube 12a.

The electron emitting device with the aforementioned structure emits electrons present in the carbon nanotube layer 12 from the surface, by applying a relatively positive bias voltage to the SiC substrate 11 using the voltage source 16, and the emitted electrons travels through the air-gap 14.

Figure 3A:
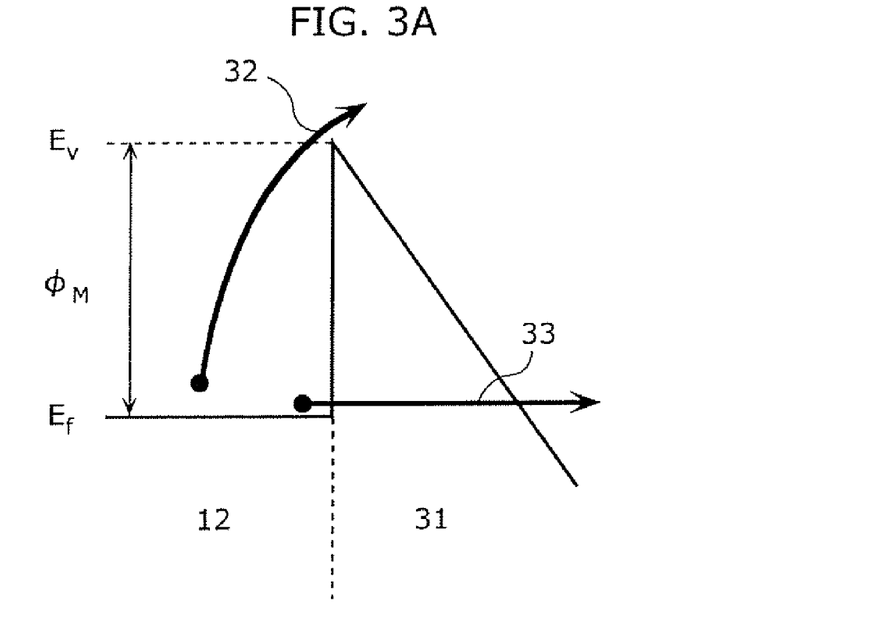
FIG. 3A is an energy diagram of the electron emission plane in the case where a positive voltage is applied from a surface vacuum side to a carbon nanotube layer of which the surface is not coated with an MgO layer.
Figure 3B:
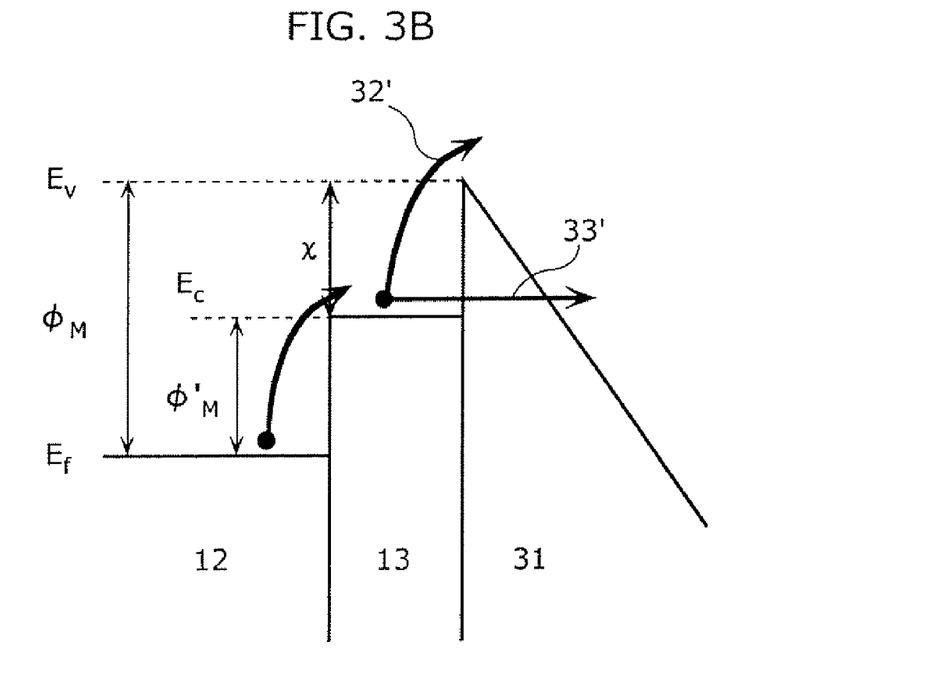
FIG. 3B is an energy diagram of the electron emission plane in the case where a positive voltage is applied from a surface vacuum side to a carbon nanotube layer of which the surface is coated with an MgO layer.

FIGS. 3A and 3B are energy diagrams of the electron emission plane. Note that FIG. 3A is the energy diagram in the case where a positive voltage is applied from a surface vacuum side 31 to the carbon nanotube layer 12 on which the surface is not coated with the MgO layer 13, and FIG. 3B is the energy diagram in the case where a positive voltage is applied from the surface vacuum side 31 to the carbon nanotube layer 12 on which the surface is coated with the MgO layer 13.

According to FIG. 3A, the electrons excited inside the carbon nanotube layer 12 on which the surface is not coated with the MgO layer 13 are emitted to the surface vacuum side 31 either via a path 32 through which a barrier corresponding to a work function $\phi_m$ of the carbon nanotube is directly overcome or a path 33 in which the barrier is passed through a tunnel. On the other hand, according to FIG. 3B, the electrons excited inside the carbon nanotube layer 12 on which the surface is coated with the MgO layer 13 are emitted to the surface vacuum side 31 either via a path 32' or a path 33' which conducts electrons via an energy level Ec in the vicinity of a conduction band of MgO. Therefore, in the carbon nanotube layer 12 on which the surface is coated with the MgO layer 13, in the case where electrons are emitted from the surface, the barrier height is lowered to the work function approximately corresponding to the electron affinity $\chi$ of MgO (normally, equal to or lower than 2 eV), and the excitation energy required for emitting electrons from the surface is reduced.

Figure 4:
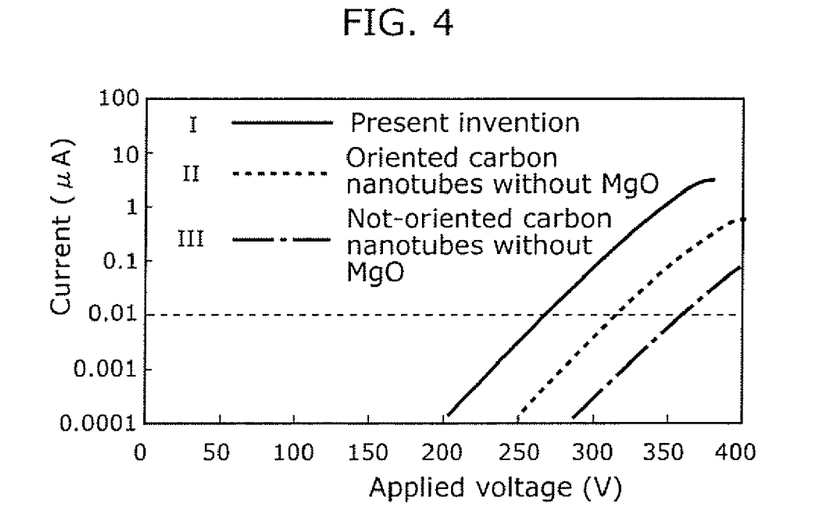
FIG. 4 is a diagram showing a current-voltage characteristic curve of the electron emitting device.

Next, the electrical characteristics of the electron emitting device with the aforementioned structure is described using FIG. 4. FIG. 4 is a diagram showing a current-voltage characteristic curve of the electron emitting device. Note that in FIG. 4, a solid line (curve I) shows the current-voltage characteristic curve of the electron emitting device with the aforementioned structure, a dotted line (curve II) shows a current-voltage characteristic curve of the electron emitting device with the aforementioned structure in which MgO is not used, and a dash-dotted line (curve III) shows a current-voltage characteristic curve of the electron emitting device with the aforementioned structure in which MgO is not used and each carbon nanotube is not oriented in the carbon nanotube layer.

According to a difference between the curve II and the curve III in FIG. 4, in the case where a voltage which is applied when a field-emission current exceeds 0.01 µA is defined as a threshold voltage, by orienting each carbon nanotube, the threshold voltage is reduced by approximately 50V, from 350V (curve III) to 300V (curve II), and the current value increases approximately tenfold, compared to the case where the applied voltage is 325V. This occurs due to the fact that the electric field intensity of each carbon nanotube tip becomes stronger by orienting each carbon nanotube. On the other hand, according to a difference between the curve I and the curve II, the threshold voltage is further reduced by approximately 50V and the current further increases approximately tenfold by coating each carbon nanotube with MgO. This occurs due to the fact that the barrier height when electrons are emitted from the surface is lowered and the electron emission efficiency increases by depositing MgO on the carbon nanotube.

As described above, according to the electron emitting device of the present embodiment, the carbon nanotube is coated with MgO. With this, the barrier height when electrons are emitted from the surface is lowered, and even when an applied voltage of a voltage source is low, electrons are emitted outside. In other words, since no high excitation energy is required as in the conventional electron emitting devices, it is possible to achieve high electron emission efficiency, even when excitation energy is low.

Furthermore, according to the electron emitting device of the present embodiment, the carbon nanotubes are oriented with respect to an electron emission direction, and the tip of the oriented carbon nanotube is coated with MgO. In this manner, as the electrons emitted from the carbon nanotube can be easily emitted from the tip of MgO to a vacuum, it becomes possible to achieve high electron emission efficiency. In this case, MgO, which has the same thickness as the MgO that is vapor-deposited when forming an MgO layer, is formed in an air-gap between the carbon nanotubes. Thus, electrons are emitted from a carbon nanotube sidewall via MgO deposited on the carbon nanotube sidewall.

Furthermore, according to the electron emitting device of the present embodiment, as the carbon nanotubes are oriented so that respective directions where electrons are emitted are aligned. With this, as electrons of which characteristics are consistent can be emitted from the tip of the carbon nanotube with certainty, it becomes possible to achieve high electron emission efficiency.

Figure 5:
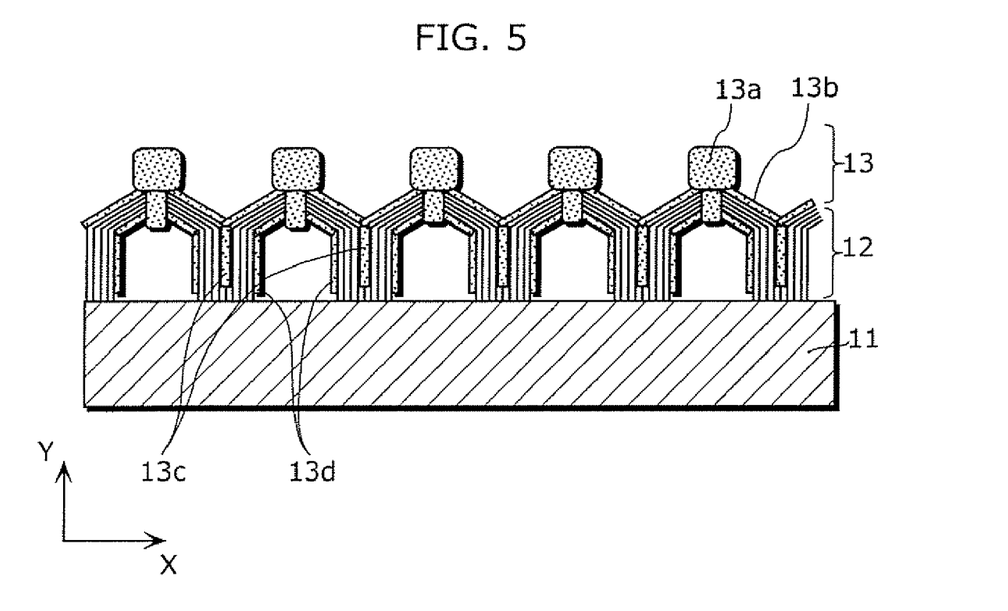
FIG. 5 is a cross-sectional view showing the detailed structure of the top surface of the electron emission plane.
Figure 6:
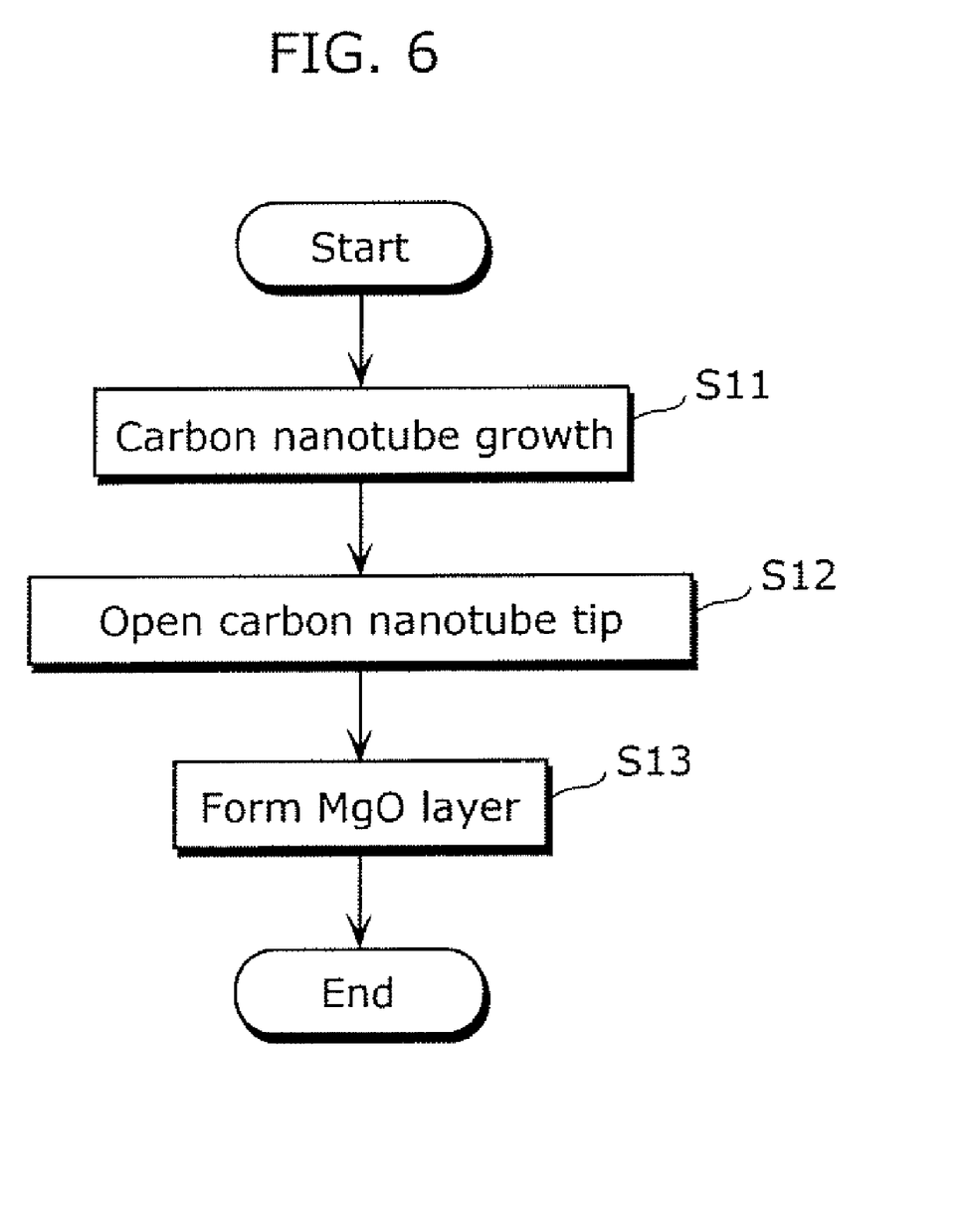
FIG. 6 is a flowchart showing a manufacturing method of the electron emitting device.

Note that according to the electron emitting device of the present embodiment, as in FIG. 5, the MgO layer 13 may include plural MgO 13c each of which is formed in an air-gap between the carbon nanotubes 12a and plural MgO 13d each of which is formed inside the carbon nanotube 12a. With this structure, it is possible to emit electrons to a vacuum via MgO deposited on the carbon nanotube sidewall and inner wall which are the portions away from the carbon nanotube tip, and to achieve high electron emission efficiency. This structure is formed with a manufacturing method shown in the flowchart in FIG. 6. In other words, first, a substrate is annealed under the condition of a temperature of 1700 centigrade degree, 20 minutes, a pressure of $10^{-2}$ Pa, and 1% of an oxygen partial pressure so as to grow a carbon nanotube (Step S11). Then, the carbon nanotube tip is thermally oxidized under the condition of a temperature of 700 centigrade degree, 20 minutes, atmospheric pressure, and 20% of an oxygen partial pressure, and the thermally oxidized portion is removed so as to open a part of the carbon nanotube tip (Step S12). Then, the present structure is formed by evaporating MgO onto the opened tip with the electron-beam evaporation method under the condition of a substrate temperature of 300 centigrade degree and a pressure of $10^{-3}$ Pa and depositing MgO with the thickness of 10 nm on the opened tip (Step S13). When evaporating MgO in a vacuum, an SiC substrate on which a carbon nanotube layer has been formed is kept at high temperatures which is equal to or more than 100 centigrade degree for selectively diffusing MgO in an air-gap and a defect of the carbon nanotube when MgO is deposited on the carbon nanotube layer. Because MgO can be sufficiently diffused within this range of temperatures in an is air-gap and a defect of each carbon nanotube when depositing MgO, and the carbon nanotubes can maintain the mechanical form. With this, the amount of MgO which is formed inside the carbon nanotube can be increased. Note that the carbon nanotube tip may be opened by irradiating an electron beam on the carbon nanotube tip so as to remove the tip.

Furthermore, although in the electron emitting device of the present embodiment, MgO is used as an example of metal oxides which are deposited on a carbon nanotube layer, as long as the metal oxides are the second group oxides, the deposited oxide is not limited to MgO. As a replacement for MgO, SrO, BaO, BeO, CaO, or an alloy of these metals can produce the similar effect.

Second Embodiment

The electromagnetic wave generating device according to the second embodiment of the present invention is described with reference to the diagrams.

Figure 7:
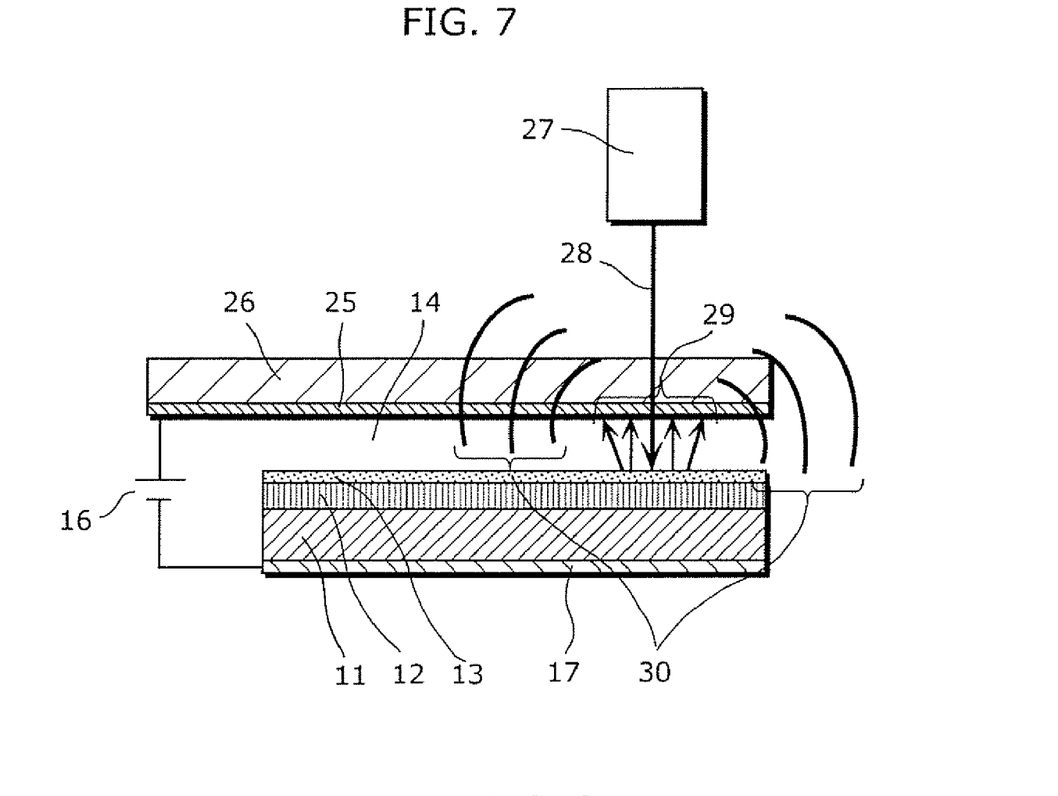
FIG. 7 is a cross-sectional view schematically showing the structure of the electromagnetic wave generating device according to the second embodiment of the present invention.

FIG. 7 is a cross-sectional view schematically showing the structure of the electromagnetic wave generating device according to the present embodiment.

As shown in FIG. 7, the carbon nanotube layer 12 is made up of plural carbon nanotubes, each with the height of 200 nm, which are vertically oriented with respect to the surface of the SiC substrate 11, and is formed on the n⁻ type SiC substrate 11. This carbon nanotube layer 12 is formed by annealing the SiC substrate 11 in a vacuum of $1 \times 10^{-5}$ Torr for 60 minutes at 1000 degree centigrade and removing Si so that carbon remains.

Furthermore, the MgO layer 13 touches the carbon nanotube layer 12, has the thickness of equal to or less than 100 nm, for example, the thickness of 10 nm, and is formed on the carbon nanotube layer 12. This MgO layer 13 is formed by depositing MgO on the carbon nanotube layer 12 with the electron-beam evaporation method. The electron emission plane is composed of the MgO layer 13 and the carbon nanotube layer 12.

Here, an ultra-short pulse light train 28 which passes through an electrode 25 and a substrate 26 is irradiated to the electron emission plane composed of the MgO layer 13 and the carbon nanotube layer 12. This ultra-short pulse light train 28 is light with energy lower than the electron affinity χ of MgO which indicates the barrier height when electrons are emitted from the electron emission plane, for example, pulse light with a wavelength of 780 nm, a pulse width of 100 fs, and a pulse repetition frequency of 50 MHz, and is generated by a femtosecond pulsed laser source 27.

Furthermore, the electrode 25 is placed above the MgO layer 13, and facing the MgO layer 13 with the air-gap 14 of the distance 10 μm, which is between the MgO layer 13 and the electrode 25. This electrode 25 is an electrode which is made of indium-tin-oxide (ITO) with the thickness of 200 nm and can apply a relatively positive bias voltage to the SiC substrate 11, and serves as an anode which collects emitted electrons. The electrode 25 is formed on the substrate 26 made of cycloolefin glass. Furthermore, the ohmic electrode 17 which is electrically connected to the carbon nanotube layer 12 is formed on the backside of the SiC substrate 11. The voltage source 16 is connected to the electrode 25 and the ohmic electrode 17, and a voltage is applied therebetween. Although it is described above that the ohmic electrode 17 is formed on the backside of the SiC substrate 11 the ohmic electrode 17 may be formed on the surface of the SiC substrate 11 by removing respective parts of the MgO layer 13 and the carbon nanotube layer 12.

Furthermore, the electron emission plane is composed as described in FIGS. 2B and 2C. In other words, the carbon nanotube layer 12 formed on the surface of the SiC substrate 11 is composed of multiwall-type carbon nanotubes 12a, each of which is made up of carbon planes with five layers in average and has an average diameter of 110 nm. Each of the carbon nanotubes 12a has a structure in which each carbon phase is closed at the top surface while a predetermined distance is maintained between the carbon planes, and each has a shape sharp tip. The MgO layer 13 in which MgO has been vapor-deposited with electron beams is formed on the carbon nanotubes 12a. The MgO layer 13 is composed of: plural MgO 13a each of which is selectively migrated to the tip of the carbon nanotube 12a, of which length with respect to the vertical direction is less than the maximum diameter of the carbon nanotube 12a, and which is placed on the tip of the carbon nanotube 12a; and MgO 13b which is formed as another portion of the MgO layer 13 other than the tips of the carbon nanotubes 12a. Thus, the reason why the migrated MgO 13a is formed on the tip of the carbon nanotube 12a is because atomic arrangement of graphite carbon in an ideal carbon phase is misaligned, and an imperfect structure is formed in which atoms are realigned, which causes extremely high chemical reactivities to different types of atoms and molecules. In this case, the temperature of the SiC substrate 11 is kept at equal to or less than 300 degree centigrade so that the maximum thickness is thinner than or preferably, equal to or less than one tenth of the maximum diameter of the carbon nanotube 12a. With this, it becomes possible to form the MgO layer 13 in which the amount to be coated with MgO on the tips of the carbon nanotubes 12a is selectively increased.

The electromagnetic wave generating device with the aforementioned structure emits electrons present inside the carbon nanotube layer 12 from the electron emission plane by applying a relatively positive bias voltage to the SiC substrate 11 from a voltage source 16 and further irradiating, to the electron emission plane, the ultra-short pulse light train 28 generated by the infemtosecond pulsed laser source 27. An electron group 29 which is field emitted from the MgO layer 13 and is collected to the electrode 25 becomes a pulse train with a time duration of an irradiated laser pulse, and pulse current approximately with a pulse width of 100 fs to 1 ps flows between the electrode 25 and the electron emission plane. Thus, an electromagnetic wave 30 is generated which has field intensity in proportion to the time change rate of this instantaneous carrying current. In this case, the frequency of the generated electromagnetic wave 30 is almost equal to an inverse number of the pulse width of the instantaneous carrying current, and is in the 1 to 10 THz range, in other words, in the terahertz range. Thus, a distance between the electrode 25 and the electron emission plane is defined as 10 μm at which the order of the wavelength of the electromagnetic wave in the terahertz range matches the order of the aforementioned distance.

Figure 8:
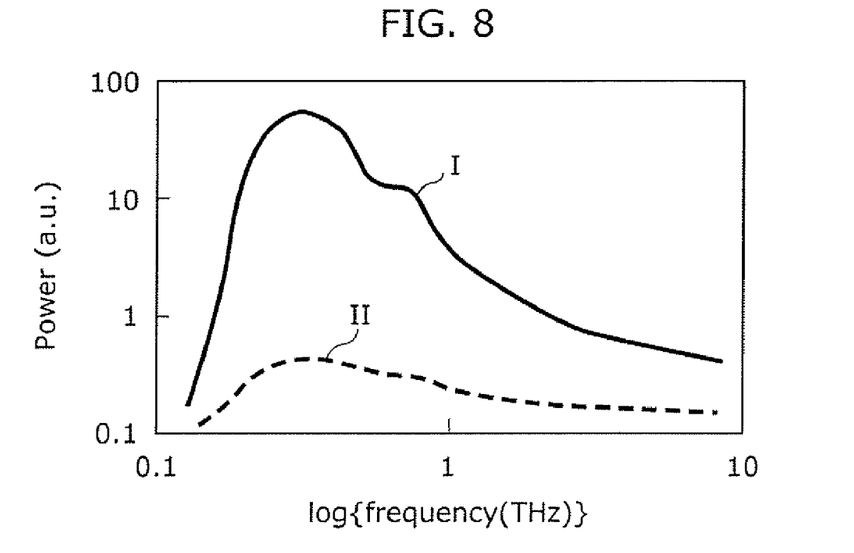
FIG. 8 is a diagram showing the power spectral characteristics of the electromagnetic wave generated by the electromagnetic wave generating device.

Next, the characteristics of the electromagnetic wave generating device with the aforementioned structure is described so with reference to FIG. 8. FIG. 8 is a diagram showing the power spectral characteristics of the electromagnetic wave generated by the electromagnetic wave generating device. Note that in FIG. 8, a solid line (curve I) shows the power spectral characteristics of the electromagnetic wave generated by the electromagnetic wave generating device with the aforementioned structure, a dotted line (curve II) shows the power spectral characteristics of the electromagnetic wave generated by the electromagnetic wave generating device with the aforementioned structure in which MgO is not used on a photoelectric surface.

According to FIG. 8, the peak power of the electromagnetic wave generated by the electromagnetic wave generating device of the present embodiment has been improved approximately 100 times as much as the peak power of the electromagnetic wave generating device in which MgO is not used. This is due to the fact that the amount of emitted current has been improved tenfold as a result of using MgO on the photoelectric surface, as shown in FIG. 4.

As described above, according to the electromagnetic wave generating device of the present embodiment, it is possible to achieve high electron emission efficiency even when excitation energy is low, due to the same reason as described in the first embodiment. In addition, with the device, a terahertz wave can be generated by emitting electrons. Thus, it is possible to realize a high-power terahertz wave generating device.

Note that although in the electromagnetic wave generating device of the present embodiment, MgO is used as an example of metal oxides which are deposited on a carbon nanotube layer, as long as the metal oxides are the second group oxides, the deposited oxide is not limited to MgO. As a replacement for MgO, SrO, BaO, BeO, CaO, or an alloy of these metals can produce the similar effect. Furthermore, although in the electromagnetic wave generating device of the present embodiment, an SiC substrate is used as an example of a substrate on which metal oxides are formed, as long as the substrate is made of carbon, the substrate is not limited to the SiC substrate. As a replacement, other types of substrates can produce the similar effect.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to an electron emitting device, in particular to a display, an electron microscope, a lighting system, an electromagnetic wave generating device, and the like.

What is claimed is:

1. An electron emitting device comprising:
   a carbon nanotube layer which is formed on a substrate and is made up of plural carbon nanotubes which are vertically oriented with respect to a surface of the substrate and each of which has a sharp tip;
   a metal oxide layer which is formed on each of the sharp tips;
   a first electrode which is connected to said carbon nanotube layer; and
   a second electrode which is facing said metal oxide layer at a distance,
   wherein each of the plural carbon nanotubes has a cavity, and an inner wall of the cavity is coated with a metallic oxide used in said metal oxide layer.

2. The electron emitting device according to claim 1, wherein a maximum thickness of said metal oxide layer is less than a maximum diameter of the carbon nanotube.

3. The electron emitting device according to claim 1, wherein a length of said metal oxide layer in a vertical direction with respect to the surface of the substrate is less than a maximum diameter of the carbon nanotube, said metal oxide layer being thickest on the tops of the tips of the plural carbon nanotubes.

4. The electron emitting device according to claim 1, wherein said metal oxide layer is formed between the plural carbon nanotubes.

5. The electron emitting device according to claim 1, wherein the metal oxide layer on the carbon nanotubes is thickest on the tops of the tips of the plural carbon nanotubes.

6. The electron emitting device according to claim 1, wherein said metal oxide layer includes one of MgO, BaO, CaO, BeO, and SrO.

7. The electron emitting device according to claim 1, wherein a thickness of a portion of said metal oxide layer which is on a tip of each of the plural carbon nanotubes is thicker than a thickness of another portion of said metal oxide layer other than the portion on said metal oxide layer which is on the tip of each of the plural carbon nanotubes.

8. An electromagnetic wave generating device comprising:
a carbon nanotube layer which is formed on a substrate and is made up of plural carbon nanotubes which are vertically oriented with respect to a surface of the substrate and each of which has a sharp tip;
a metal oxide layer which is formed on each of the sharp tips;
a light source which irradiates pulse light to said carbon nanotube layer;
a first electrode which is connected to said carbon nanotube layer; and
a second electrode which is facing said metal oxide layer at a distance;
wherein each of the plural carbon nanotubes has a cavity, and an inner wall of the cavity is coated with a metallic oxide used in said metal oxide layer.

9. The electromagnetic wave generating device according to claim 8, wherein the metal oxide layer on the carbon nanotubes is thickest on the tops of the tips of the plural carbon nanotubes.

* * * * *